(12) United States Patent
Wu et al.

(10) Patent No.: US 11,169,945 B1
(45) Date of Patent: Nov. 9, 2021

(54) BRIDGE SUPPORTING MULTIPLE INTERFACES ACCESS TO SUBSYSTEM

(71) Applicant: Xilinx, Inc., San Jose, CA (US)

(72) Inventors: Danny Tsung-Heng Wu, San Jose, CA (US); Roger D. Flateau, Jr., San Jose, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 16/675,997

(22) Filed: Nov. 6, 2019

(51) Int. Cl.
*G06F 13/40* (2006.01)
*G06F 9/54* (2006.01)
*G06F 13/42* (2006.01)
*G06F 9/4401* (2018.01)

(52) U.S. Cl.
CPC ........ *G06F 13/4022* (2013.01); *G06F 9/4411* (2013.01); *G06F 9/542* (2013.01); *G06F 13/4221* (2013.01)

(58) Field of Classification Search
CPC .. G06F 13/4022; G06F 9/542; G06F 13/4221; G06F 9/4411
See application file for complete search history.

(56) References Cited

U.S. PATENT DOCUMENTS

| | | | | |
|---|---|---|---|---|
| 7,019,558 | B1* | 3/2006 | Jacobson | G06F 30/34 326/38 |
| 2002/0118315 | A1* | 8/2002 | Hong | H04N 21/4334 348/839 |
| 2008/0276015 | A1* | 11/2008 | Kim | G06K 19/07 710/19 |
| 2016/0294706 | A1* | 10/2016 | Lang | H04W 12/069 |
| 2018/0137082 | A1* | 5/2018 | Cawley | G06F 13/24 |

\* cited by examiner

*Primary Examiner* — Ernest Unelus
*Assistant Examiner* — Ronald T Modo
(74) *Attorney, Agent, or Firm* — Patterson + Sheridan, LLP (57) ABSTRACT

A device includes a processor, an SBI, and a plurality of interfaces. The processor is configured to manage operations of the device. The SBI is coupled to the processor. The plurality of interfaces is associated with the SBI. The interfaces of the plurality of interfaces have different interface protocol from one another. The SBI is configured by the processor and the configuration of the SBI activates one interface of the plurality of interfaces at any given time. The active interface that is selected from the plurality of interfaces and a host have a same interface protocol. The active interface is configured to receive host data from the host. The SBI is configured to generate a flag for the processor in response to the active interface receiving the host data. The SBI is configured to transmit device data to the host.

19 Claims, 5 Drawing Sheets

BRIDGE SUPPORTING MULTIPLE INTERFACES ACCESS TO SUBSYSTEM

TECHNICAL FIELD

The disclosure generally relates to a bridge that provides access to internal components of a device and more particularly to a bridge that supports multiple interfaces of a host to access the internal components.

BACKGROUND

In general, a host may need access to various components of a device. For example, traditionally a system on a chip (SOC) supports access to slave boot modes with a packet processor and Finite State Machine. Unfortunately, using Finite State Machine is not only restrictive and inflexible but the packet processor cannot be updated in the field once deployed. In programmable devices, partial reconfiguration typically uses Internal Configuration Port (ICP) to expose the SelectMAP signals to the fabric, which is bandwidth limited. Furthermore, a processor, e.g., a central processing unit (CPU), is a master in the system and typically lacks the ability to receive data from hosts.

SUMMARY

Accordingly, a need has arisen to provide multiple hosts, e.g., SelectMAP, Joint Test Action Group (JTAG), Debugger, Universal Serial Bus (USB), Peripheral component Interconnect Express (PCIe), etc., access to internal components, e.g., the Platform Management Controller (PMC) subsystem, to perform various operations, e.g., boot image loading, device configuration, partial reconfiguration, configuration memory readback for debug and error checking, etc. Furthermore, a need has arisen to support access using any commands or header formats that the host, e.g., a user firmware, is coded with, without a need to change the silicon. Moreover, it is advantageous to expose SelectMAP signals to the fabric with increased bandwidth. Additionally, it is desirable to push host data onto the device without a processor, e.g., central processing unit (CPU), having to be a master in directing the operations.

In some embodiments, a slave boot interface (SBI) is used. The SBI has multiple interfaces associated therewith. The processor configures the SBI to be associated with an appropriate interface for receiving the host data by activating one interface at a time while deactivating other interfaces. Once the appropriate interface is selected and activated through configuration of the SBI, the host data can be streamed and buffered. The SBI generates a flag for the processor notifying the processor that host data is available. Thus, the processor may take over the operation at this point and send the received host data to the appropriate component. In addition, the processor may similarly cause a component within the device to send device data to the SBI where the SBI is configured to transmit the received device data to a host through an appropriate interface, e.g., an interface that has the same interface protocol as the host.

In some embodiments, a device includes a processor, an SBI, and a plurality of interfaces. The processor is configured to manage operations of the device. The SBI is coupled to the processor. The plurality of interfaces is associated with the SBI. The interfaces of the plurality of interfaces have different interface protocol from one another. The SBI is configured by the processor and the configuration of the SBI activates one interface of the plurality of interfaces at any given time. The active interface that is selected from the plurality of interfaces and a host have a same interface protocol. The active interface is configured to receive host data from the host. The SBI is configured to generate a flag for the processor in response to the active interface receiving the host data. The SBI is configured to transmit device data to the host.

In some embodiments the SBI is configured to convert the interface protocol of the host data to an internal bus interface, e.g., advanced extensible interface (AXI), protocol destined for a component within the device and vice versa. The component is selected from a group consisting of a random access memory (RAM) memory associated with the processor, network-on-chip (NOC), PMC, NOC peripheral interface (NPI), and a configuration frame unit (CFU).

It is appreciated that the interfaces for the plurality of interfaces are selected from a group consisting of Select-MAP, JTAG, Debugger, USB, and PCIe. According to one embodiment the debugger is coupled to a debug packet controller (DPC) and DPC switch. In some embodiments, the USB and the PCIe are coupled to the SBI via NOC and a system bus respectively.

In some embodiments, the SBI is configured to stream the host data into the device and to buffer the received host data. The SBI is configured to stream the device data out to the host.

It is appreciated that in some embodiments, the SBI is reconfigured by the processor and the reconfiguration of the SBI activates another interface of the plurality of interfaces. The another interface that is selected from the plurality of interfaces and another host have a same interface protocol. The another interface is configured to receive another host data from the another host. The SBI is reconfigured to generate another flag for the processor in response to the another interface receiving the another host data. The SBI is reconfigured to transmit device data to the another host.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Examples described herein relate to providing multiple hosts, e.g., SelectMAP, Joint Test Action Group (JTAG), Debugger, Universal Serial Bus (USB), Peripheral component Interconnect Express (PCIe), etc., access to internal components, e.g., the Platform Management Controller (PMC) subsystem, to perform various operations, e.g., boot image loading, device configuration, partial reconfiguration, configuration memory readback for debug and error checking, etc. Furthermore, the examples support access using any commands or header formats that the host, e.g., a user firmware, is coded with, without a need to change the silicon. The embodiments further expose SelectMAP signals to the fabric with increased bandwidth, in one alternative. It is appreciated that the in some embodiments a high bandwidth standard interface (AXI) may be used instead. Additionally, host data is pushed onto the device without a processor, e.g., central processing unit (CPU), having to be a master in directing the operations.

In some embodiments, a slave boot interface (SBI) is used. The SBI has multiple interfaces associated therewith. The processor configures the SBI to be associated with an appropriate interface for receiving the host data by activating one interface at a time while deactivating other interfaces. Once the appropriate interface is selected and activated through configuration of the SBI, the host data can be streamed and buffered. The SBI generates a flag for the processor notifying the processor that host data is available. Thus, the processor may take over the operation at this point and send the received host data to the appropriate component. In addition, the processor may similarly cause a component within the device to send device data to the SBI where the SBI is configured to transmit the received device data to a host through an appropriate interface, e.g., an interface that has the same interface protocol as the host.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. For example, various methods according to some examples can include more or fewer operations, and the sequence of operations in various methods according to examples may be different than described herein. In addition, an illustrated example need not have all the aspects or advantages shown. An aspect or an advantage described in conjunction with a particular example is not necessarily limited to that example and can be practiced in any other examples even if not so illustrated or if not so explicitly described.

Some general concepts will first be described to clarify terms and nomenclature used throughout this description.

Figure 1:
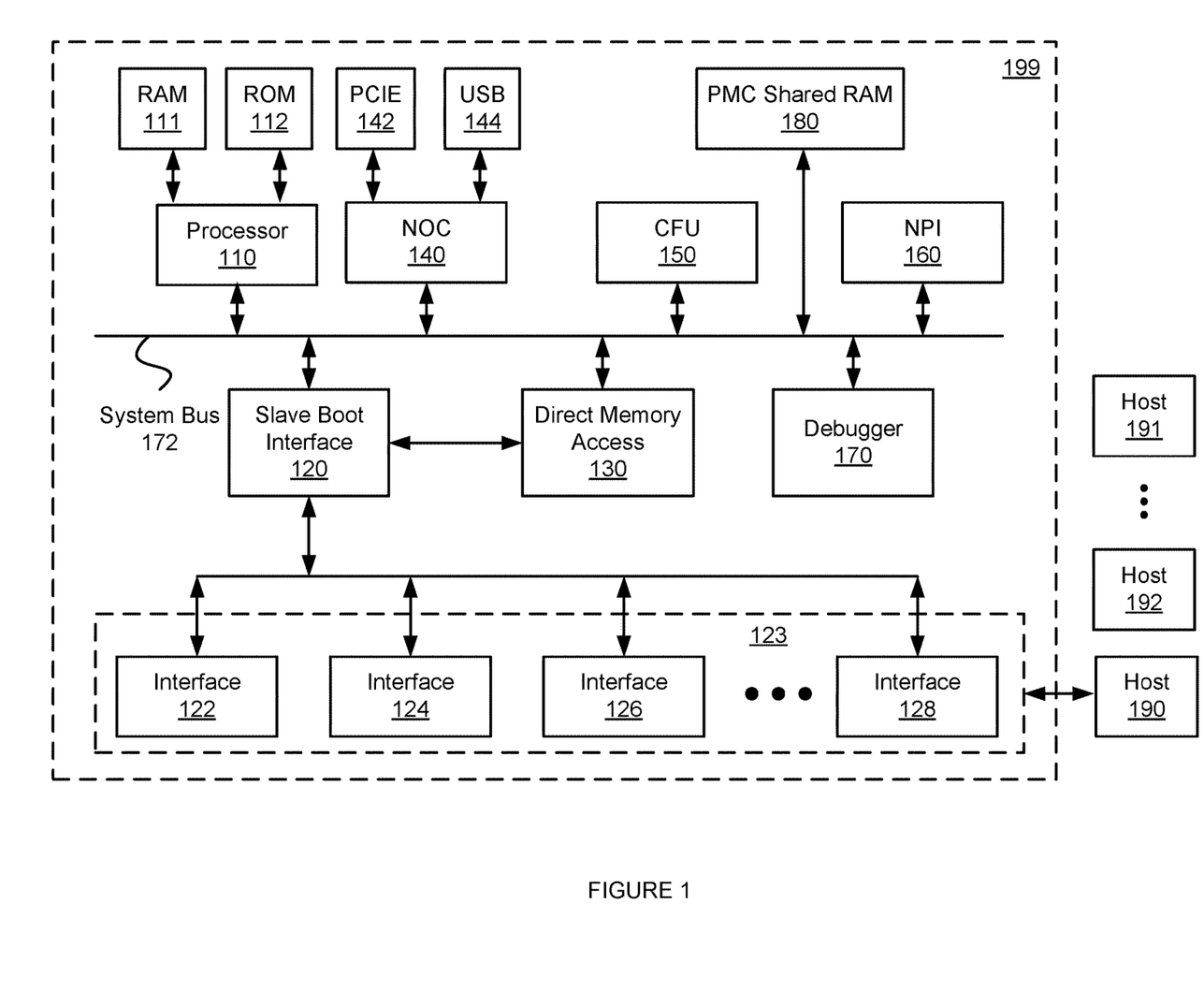
FIG. 1 shows a block diagram depicting a device with multiple interfaces providing access to multiple hosts, according to some examples.
Figure 3:
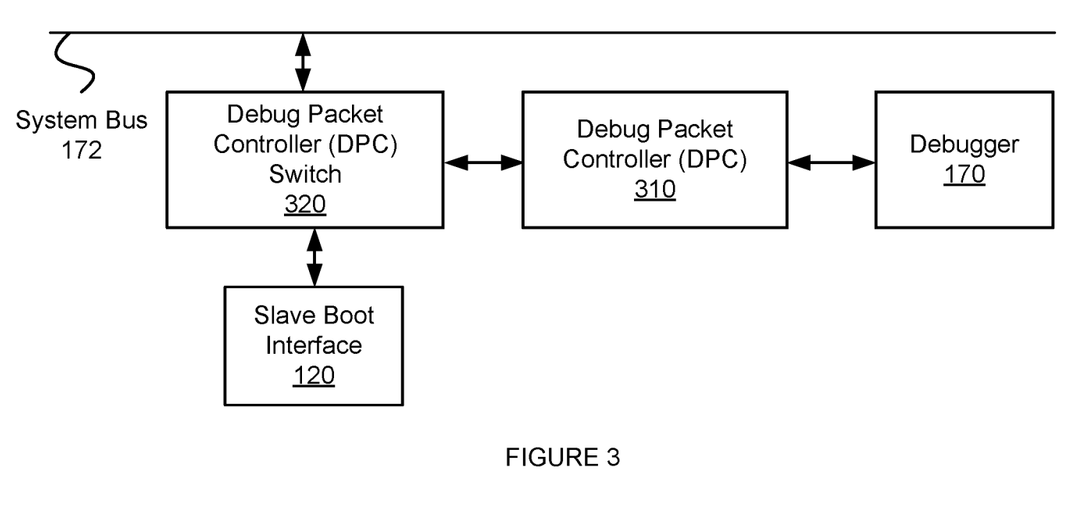
FIG. 3 shows an illustrative block diagram depicting a debug packet controller, according to some examples.

FIG. 1 shows a block diagram depicting a device with multiple interfaces providing access to multiple hosts, according to some examples. The device 199 includes a processor 110, e.g., a CPU, an SBI 120 and a plurality of interfaces 123 that includes interfaces 122, 124, 126, ..., 128. It is appreciated that the interfaces 122, 124, 126, ..., 128 may have different interface protocols from one another. For example, interface 122 may be a SelectMAP, interface 124 may be a JTAG, interface 126 may be a Debugger, interface 129 may be a USB, and another interface (not explicitly shown) may be a PCIe. It is appreciated that in some embodiments, the SBI 120 may be connected to the USB 144 interface through a network-on-chip (NOC) 140. It is further appreciated that in some embodiments, the SBI 120 may be connected to the PCIe 142 interface through the NOC 140. According to some embodiments, the PCIe 142 interface may be connected to the SBI 120 through a PCIe Controller (not shown), NOC 140, and system bus 172. In some embodiments a debugger 170 interface may be connected to the SBI 120 through a debug packer controller (DPC) 310 and a DPC switch 320, as illustrated in FIG. 3. In some embodiments, the debugger 170 is also connected to the system bus 172 through DPC 310 and DPC switch 320, as illustrated. It is appreciated that various components of the device 199 are connected to one another using the system bus 172, e.g., advanced extensible interface (AXI), AXI4, etc. For example, referring back to FIG. 1, the processor 110 is connected to the SBI 120 using the system bus 172. Moreover, the processor 110, the NOC 140, the Configuration Frame Unit (CFU) 150 used for loading configuration data into programmable logic such as a field programmable gate array (FPGA), the NOC peripheral interface (NPI) 160 for partial reconfiguration, the SBI 120, the Direct Memory Access (DMA) 130, and the debugger 170 are connected to one another using the system bus 172.

It is appreciated that when a host 190 with a particular interface protocol, e.g., SelectMAP, Joint Test Action Group (JTAG), Debugger, Universal Serial Bus (USB), Peripheral component Interconnect Express (PCIe), etc., connects to the device 199, regardless of the interface protocol of the host 190, communication between the host 190 and the device 199 can be established. The host 190 may be an external host to the device 199. As such, the host 190 may be provided access using any commands or header formats that the processor 110, e.g., a user firmware, is coded with, without a need to change the silicon. In other words, access to internal components, e.g., PMC subsystem, can be provided in order to perform various operations, e.g., boot image loading, device configuration, partial reconfiguration, configuration memory readback for debug and error checking, etc., without changes to the silicon. It is appreciated that other hosts, e.g., hosts 191, ..., 192 may similarly connect to the device 199 regardless of the interface protocol of the respective hosts 191, ..., 192.

Figure 2:
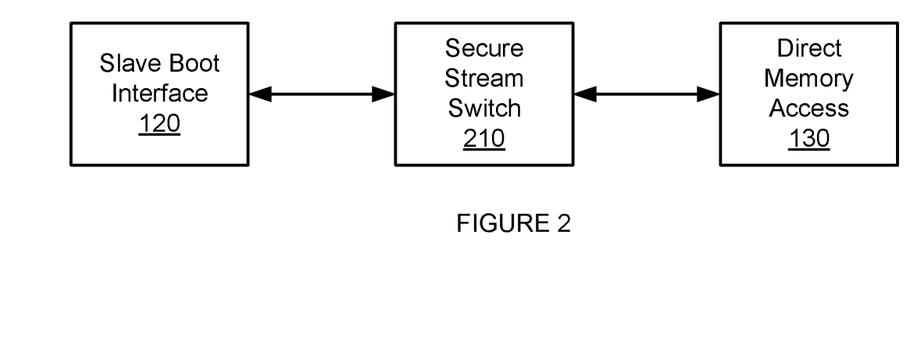
FIG. 2 shows a slave boot interface (SBI) streaming and buffering host data, according to some examples.

In some embodiments, the processor 110 configures the SBI 120 to select and activate only one interface from the plurality at a time, e.g., interface 124 may be activated while all other interfaces within the plurality of interfaces 123 are deactivated as well as the PCIe 142 interface and USB 144 interface. The activated interface has the same interface protocol as the host 190. Accordingly, when the host 190 sends host data (i.e. command, data, etc.) (hereinafter referred to as data or host data), the activated interface, e.g., interface 124, receives the host 190 data. The SBI 120 may stream and buffer the received host 190 data by storing it in its large internal memory buffer. It is appreciated that the SBI 120 may stream and buffer data in the DMA 130 through a secure stream switch 210, as illustrated in FIG. 2.

Referring back to FIG. 1, the SBI 120 may convert the interface protocol of the host 190 data to an internal bus interface protocol destined for a component within the device. It is appreciated that the processor 110 is typically designed to be the master and to manage the operations within the device 199. In this embodiment, the SBI 120 generates a flag for the processor 110 indicating that the host 190 is sending host 190 data to the SBI 120 that is being buffered. In some embodiments, the SBI 120 generates a flag for the processor 110 indicating that the host 190 has sent host 190 data to the SBI 120 which has been buffered. As such, the processor 110 may take over the operation as a master. Accordingly, access to internal components of the device 199 may be provided to perform certain operations, e.g., boot image loading, device configuration, partial reconfiguration, configuration memory readback for debug and error checking, etc. In some embodiments, the processor 110 can route the received host 190 data from the DMA 130 to its desired destination, e.g., PMC shared random access memory (RAM) 180 for image and header processing, RAM 111 associated with the processor 110 for firmware loading, NOC 140, NPI 160 for partial reconfiguration, CFU 150 for programmable logic configuration, etc. It is appreciated that any component within the device 199 may similar send data out to the host 190 in a similar fashion. It is appreciated that the SBI 120 may convert the internal bus interface protocol of the data to the interface protocol of the host 190 before sending the data out to the host 190.

Accordingly, SBI 120 facilitates data/command transfer between the host 190 and any internal component of the device 199 without a need for the host 190 to have apriori knowledge of the interface protocol or addressing within the device 199. Moreover, the embodiments as described, provide greater flexibility to create headers that the firmware can process. For example, if a user decides to change the functionality of data processing through SBI 120, a new header can be created with a firmware update. Moreover, data readback from any memory component or register becomes possible and can be sent to the host 190 for processing, thereby enabling the system status to be checked as well as checking for data integrity, etc. It is further appreciated that a much higher bandwidth can be achieved over the conventional system, e.g., ICAP, since use of the SBI 120 enables the use of the system bus 172, e.g., AXI, AXI4, etc., which achieves a much higher bandwidth.

It is appreciated that the embodiments described are with respect to specific destination component and specific interfaces for illustrative purposes and should not be construed as limiting the scope of the embodiments. For example, the embodiments described can be extended to a read out from any specific register, entire register space for debugging purposes, or system monitoring. Furthermore, the embodiments can be extended to read out of device status for safety system design, load an entire RAM, clear an entire RAM, etc., to name a few.

Figure 4:
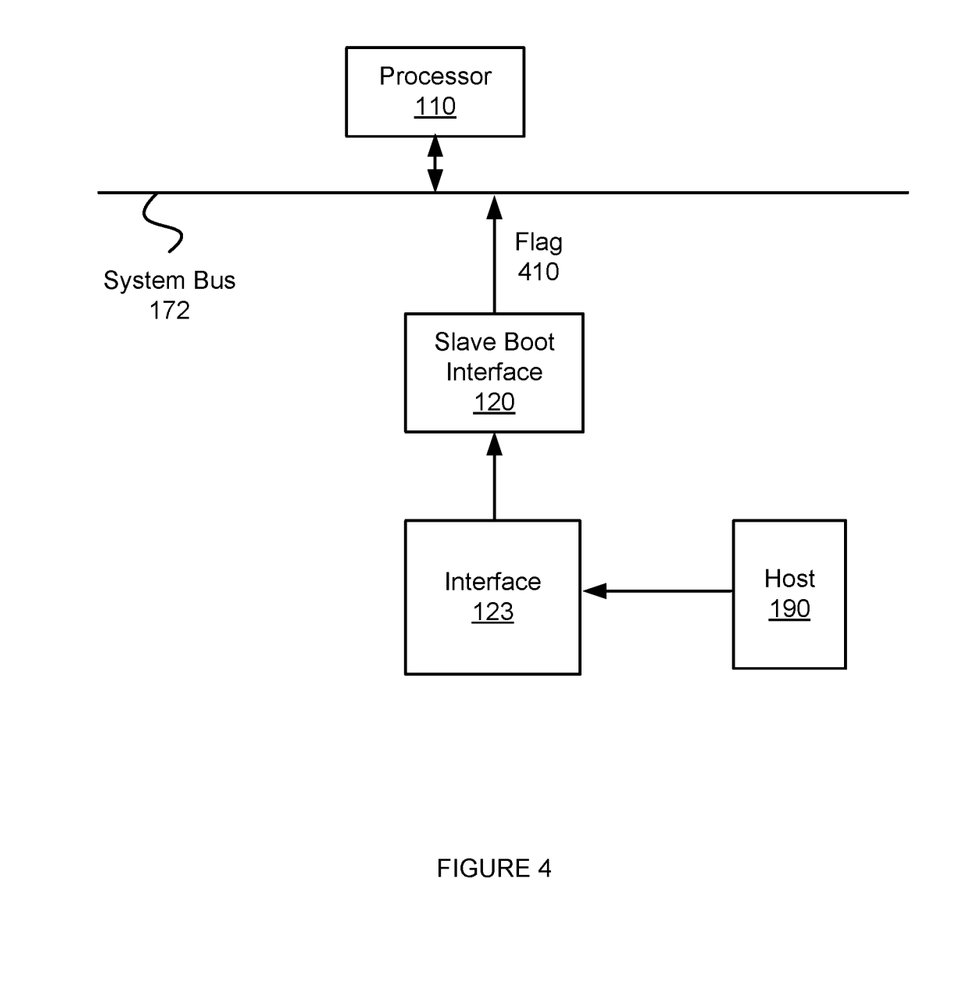
FIG. 4 shows an SBI generating a flag for the processor, according to some examples.

FIG. 4 shows an SBI generating a flag for the processor, according to some examples. In this embodiment, the processor 110 configures the SBI 120, through the system bus 172, in order to select and activate only one interface from the bank of interfaces 123, as an example. Once the configuration of SBI 120 is complete, the host 190 may transmit data/command to the activated interface within the bank of interfaces 123. The SBI 120 may stream and buffer the received data/command and generates a flag 410 for the processor 110. The flag 410 indicates the presence of data/command for the processor 110. The processor 110 takes over as a master and may route the received command/data that is buffered to a destination component within the device. In some embodiments, the processor 110 may cause the destination component within the device to send data associated with that component to the SBI 120, which may be sent using the SBI 120 and the active interface of the bank of interfaces 123 to the host 190.

Figure 5:
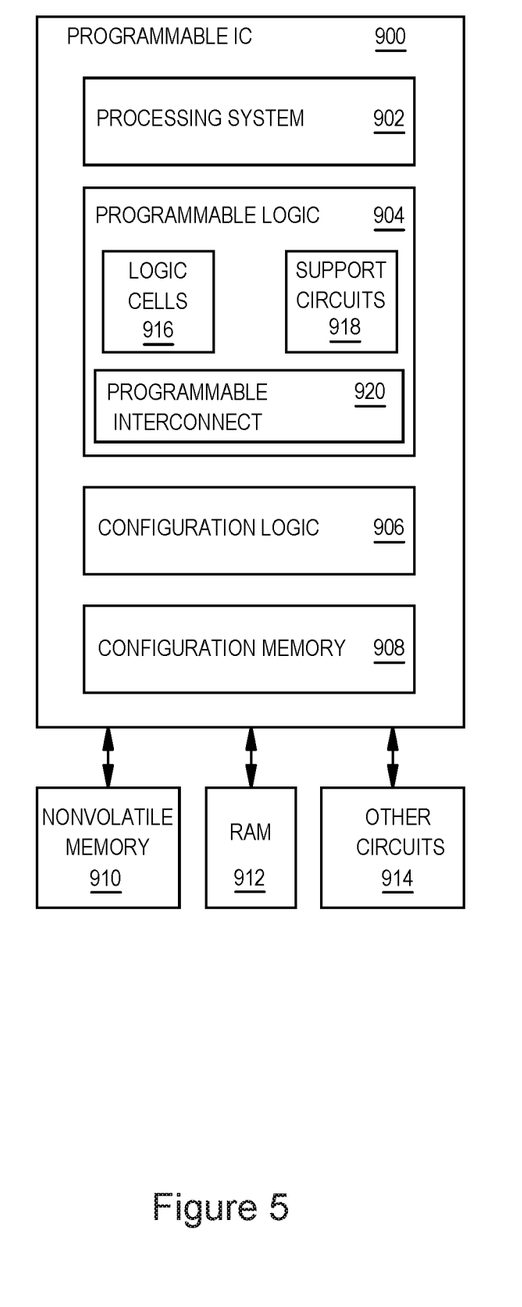
FIG. 5 is a block diagram depicting a programmable integrated circuit (IC), according to some examples.

FIG. 5 is a block diagram depicting a programmable integrated circuit (IC) 900 according to an example. The programmable IC 900 can implement the integrated circuit (IC) chip of systems of FIGS. 1-4, in whole or in part. The programmable IC 900 includes a processing system 902, programmable logic 904, configuration logic 906, and configuration memory 908. The programmable IC 900 can be coupled to external circuits, such as nonvolatile memory 910, RAM 912, and other circuits 914.

In the example of FIG. 5, the processing system 902 can include microprocessor(s), memory, support circuits, IO circuits, and the like. The programmable logic 904 includes logic cells 916, support circuits 918, and programmable interconnect 920. The logic cells 916 include circuits that can be configured to implement general logic functions of a plurality of inputs. The support circuits 918 include dedicated circuits, such as transceivers, input/output blocks, digital signal processors, memories, and the like. The logic cells and the support circuits 918 can be interconnected using the programmable interconnect 920. Information for programming the logic cells 916, for setting parameters of the support circuits 918, and for programming the programmable interconnect 920 is stored in the configuration memory 908 by the configuration logic 906. The configuration logic 906 can obtain the configuration data from the nonvolatile memory 910 or any other source (e.g., the RAM 912 or from the other circuits 914).

Figure 6:
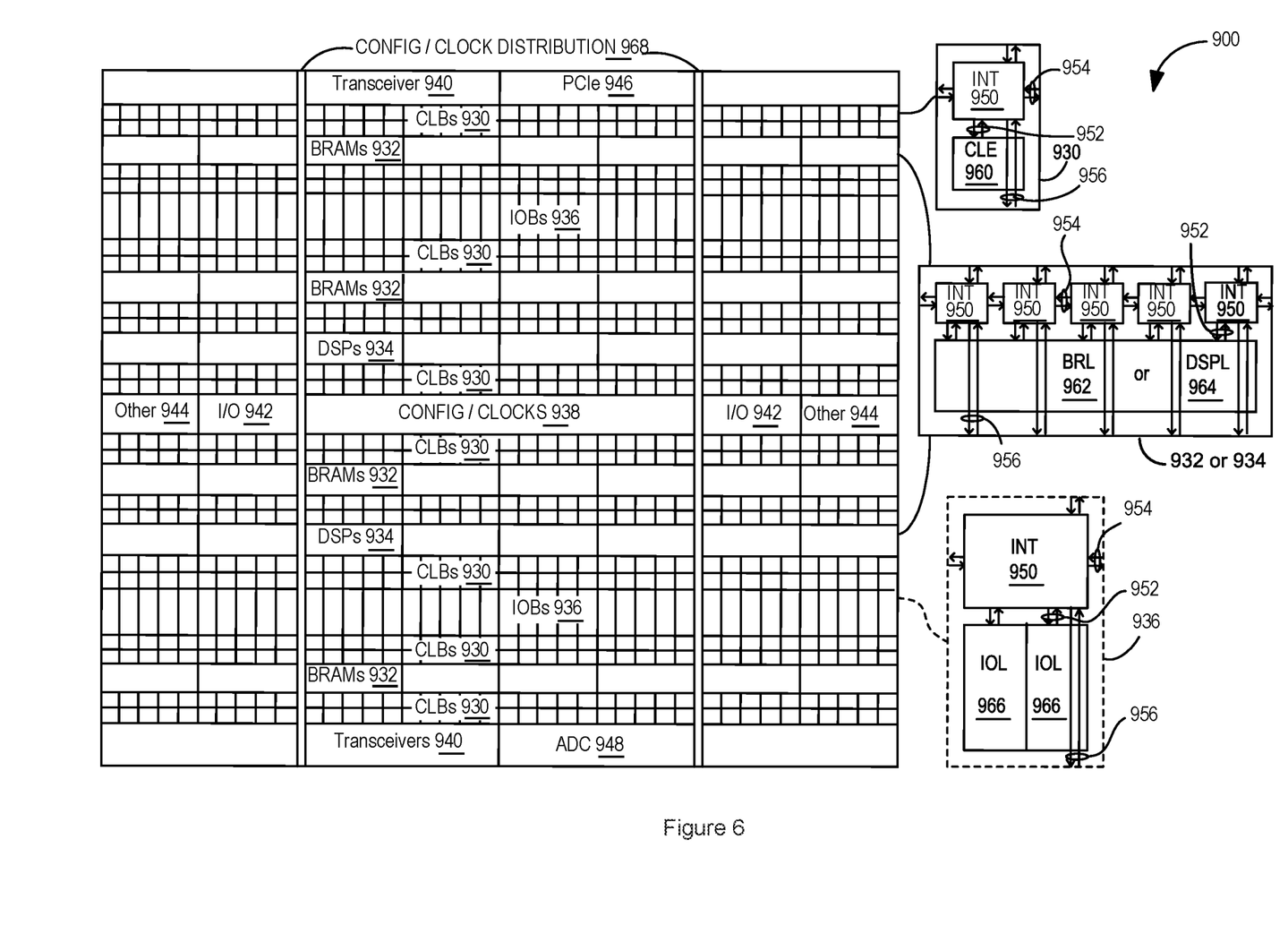
FIG. 6 is a field programmable gate array (FPGA) implementation of the programmable IC, according to some examples.

FIG. 6 illustrates an FPGA implementation of the programmable IC 900 that includes a large number of different programmable tiles including configurable logic blocks ("CLBs") 930, random access memory blocks ("BRAMs") 932, signal processing blocks ("DSPs") 934, input/output blocks ("IOBs") 936, configuration and clocking logic ("CONFIG/CLOCKS") 938, digital transceivers 940, specialized input/output blocks ("I/O") 942 (e.g., configuration ports and clock ports), and other programmable logic 944 such as digital clock managers, system monitoring logic, and so forth. The FPGA can also include PCIe interfaces 946, analog-to-digital converters (ADC) 948, and the like.

In some FPGAs, each programmable tile can include at least one programmable interconnect element ("INT") 950 having connections to input and output terminals 952 of a programmable logic element within the same tile, as shown by examples included in FIG. 6. Each programmable interconnect element 950 can also include connections to interconnect segments 954 of adjacent programmable interconnect element(s) in the same tile or other tile(s). Each programmable interconnect element 950 can also include connections to interconnect segments 956 of general routing resources between logic blocks (not shown). The general routing resources can include routing channels between logic blocks (not shown) comprising tracks of interconnect segments (e.g., interconnect segments 956) and switch blocks (not shown) for connecting interconnect segments. The interconnect segments of the general routing resources (e.g., interconnect segments 956) can span one or more logic blocks. The programmable interconnect elements 950 taken together with the general routing resources implement a programmable interconnect structure ("programmable interconnect") for the illustrated FPGA.

In an example implementation, a CLB 930 can include a configurable logic element ("CLE") 960 that can be programmed to implement user logic plus a single programmable interconnect element ("INT") 950. A BRAM 932 can include a BRAM logic element ("BRL") 962 in addition to one or more programmable interconnect elements. Typically, the number of interconnect elements included in a tile depends on the height of the tile. In the pictured example, a BRAM tile has the same height as five CLBs, but other numbers (e.g., four) can also be used. A signal processing block 934 can include a DSP logic element ("DSPL") 964 in addition to an appropriate number of programmable interconnect elements. An IOB 936 can include, for example, two instances of an input/output logic element ("IOL") 966 in addition to one instance of the programmable interconnect element 950. As will be clear to those of skill in the art, the actual I/O pads connected, for example, to the input/output logic element 966 typically are not confined to the area of the input/output logic element 966.

In the pictured example, a horizontal area near the center of the die is used for configuration, clock, and other control logic. Vertical columns 968 extending from this horizontal area or column are used to distribute the clocks and configuration signals across the breadth of the FPGA.

Some FPGAs utilizing the architecture illustrated in FIG. 6 include additional logic blocks that disrupt the regular columnar structure making up a large part of the FPGA. The additional logic blocks can be programmable blocks and/or dedicated logic.

Note that FIG. 6 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 6 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

While the foregoing is directed to specific examples, other and further examples may be devised without departing from the basic scope thereof, and the scope thereof is determined by the claims that follow.

What is claimed is:

1. A device comprising:
a processor configured to manage operations of the device;
a plurality of interfaces, wherein interfaces of the plurality of interfaces have a different interface protocol from one another; and
a slave boot interface (SBI) coupled to each of the plurality of interfaces between the processor and the plurality of interfaces,
wherein the SBI is configured by the processor and wherein the configuration of the SBI activates one interface of the plurality of interfaces at any given time,
wherein the active interface that is selected from the plurality of interfaces and a host have a same interface protocol, wherein the active interface is configured to receive host data from the host, wherein the SBI is configured to store the host data in an internal buffer, wherein the SBI is configured to generate a flag to the processor in response to the active interface receiving the host data, the flag indicating a presence of the host data received via the active interface stored in the internal buffer for the processor, and wherein the SBI is configured to transmit device data to the host, and
wherein the SBI is reconfigured by the processor, wherein the reconfiguration of the SBI activates another interface of the plurality of interfaces to communicate with another host, wherein the another active interface and the another host have a another same interface protocol, wherein the SBI is configured to generate another flag to the processor in response to the another active interface receiving another host data from the another host is, the another flag indicating a presence of the another host data received via the another active interface stored in the internal buffer for the processor, and wherein the host and the another host are connected to the device.

2. The device of claim 1, wherein the SBI is configured to convert the interface protocol of the host data to an internal bus interface protocol destined for a component within the device and wherein the SBI is configured to convert the internal bus interface protocol from the component within the device destined for the interface protocol of the host data.

3. The device of claim 2, wherein the internal bus interface is advance extensible interface (AXI).

4. The device of claim 2, wherein the component is selected from a group consisting of a random access memory (RAM) memory associated with the processor, network-on-chip (NOC), Platform Management Controller (PMC) shared RAM, NOC peripheral interface (NPI), and a configuration frame unit (CFU).

5. The device of claim 1, wherein interfaces for the plurality of interfaces are selected from a group consisting of SelectMAP, Joint Test Action Group (JTAG), and Debugger.

6. The device of claim 5, wherein the debugger is coupled to a debug packet controller (DPC) and DPC switch.

7. The device of claim 1, wherein the SBI is further coupled to one of a Universal Serial Bus (USB) and a Peripheral component Interconnect Express (PCIe) via a network-on-chip (NOC) and a system bus, respectively.

8. The device of claim 1, wherein the SBI is configured to stream the host data into the device and to buffer the received host data, and wherein the SBI is configured to stream the device data out to the host.

9. A system comprising:
a host; and
a device comprising:
a processor configured to manage operations of the device;
a plurality of interfaces, wherein interfaces of the plurality of interfaces have a different interface protocol from one another; and
a slave boot interface (SBI) coupled to each of the plurality of interfaces between the processor and the plurality of interfaces,
wherein the processor selects one interface of the plurality of interfaces, wherein the selected interface has a same interface protocol as the host, and wherein the processor responsive to the selection configures the SBI to activate the selected one interface,
wherein the active interface is configured to receive host data from the host, wherein the SBI is configured to store the host data in an internal buffer, wherein the SBI is configured to generate a flag to the processor in response to the active interface receiving the host data, the flag indicating a presence of the host data received via the active interface stored in the internal buffer for the processor, and wherein the SBI is configured to transmit device data to the host,
and wherein the SBI is reconfigured by the processor, wherein the reconfiguration of the SBI activates another interface of the plurality of interfaces to communicate with another host, wherein the another active interface and the another host have a same interface protocol, wherein the SBI is configured to generate another flag to the processor in response to the another active interface receiving the another host data from the another host, the another flag indicating a presence of the another host data received via the another active interface stored in the internal buffer for the processor, and wherein the host and the another host are connected to the device.

10. The system of claim 9, wherein only one interface of the plurality of interfaces is active at any given time.

11. The system of claim 9, wherein the SBI is configured to convert the interface protocol of the host data to an internal bus interface protocol destined for a component within the device and wherein the SBI is configured to convert the internal bus interface protocol from the component within the device destined for the interface protocol of the host data.

12. The system of claim 11, wherein the internal bus interface is advance extensible interface (AXI).

13. The system of claim 11, wherein the component is selected from a group consisting of a random access memory (RAM) memory associated with the processor, network-on-chip (NOC), Platform Management Controller (PMC) shared RAM, NOC peripheral interface (NPI), and a configuration frame unit (CFU).

14. The system of claim 9, wherein interfaces for the plurality of interfaces are selected from a group consisting of SelectMAP, Joint Test Action Group (JTAG), and Debugger.

15. The system of claim 14, wherein the debugger is coupled to a debug packet controller (DPC) and DPC switch.

16. The system of claim 14, wherein the SBI is further coupled to one of a Universal Serial Bus (USB) and a Peripheral component Interconnect Express (PCIe) via a network-on-chip (NOC) and a system bus, respectively.

17. The system of claim 9, wherein the SBI is configured to stream the host data into the device and to buffer the received host data, and wherein the SBI is configured to stream the device data out to the host.

18. The system of claim 9, wherein the host has no prior knowledge of interface protocol of the device and addressing within the device.

19. A method comprising:
configuring a slave boot interface (SBI), disposed between and coupled to both of a processor and a plurality of interfaces, to select one interface of the plurality of interfaces based on an interface protocol associated with a host data;
receiving host data from the host;
streaming the host data and buffering the host data;
generating a flag, indicating a presence of the host data received via the selected one interface stored in an internal buffer for the processor, to the for a processor to take action associated with the host data in response to the selected one interface receiving the host data;
converting interface protocol of the host data to an internal bus interface protocol to form a converted external data destined for a component;
sending the converted external data to the component;
reconfiguring the SBI to select and activate another interface of the plurality of interfaces, wherein the another interface that is selected from the plurality of interfaces and another host have a same interface protocol;
receiving another host data from the another host at the another interface;
generating another flag, indicating a presence of the another host data received via the another interface stored in the internal buffer for the processor, to the processor in response to the another interface receiving the another host data; and
transmitting device data to the another host, and wherein the host and the another host are connected to the device.

* * * * *

UNITED STATES PATENT AND TRADEMARK OFFICE
CERTIFICATE OF CORRECTION

PATENT NO. : 11,169,945 B1
APPLICATION NO. : 16/675997
DATED : November 9, 2021
INVENTOR(S) : Danny Tsung-Heng Wu It is certified that error appears in the above-identified patent and that said Letters Patent is hereby corrected as shown below:

In the Claims

Column 7, Line 66, In Claim 1, after "have" delete "a another".

Column 8, Line 3, In Claim 1, delete "host is," and insert -- host, --, therefor.

Column 10, Line 15, In Claim 19, after "to the" delete "for a".

Signed and Sealed this
Third Day of May, 2022

Katherine Kelly Vidal
*Director of the United States Patent and Trademark Office*